United States Patent
Barbu et al.

(10) Patent No.: US 12,328,704 B2
(45) Date of Patent: Jun. 10, 2025

(54) POSITION ESTIMATION

(71) Applicant: Nokia Technologies Oy, Espoo (FI)

(72) Inventors: Oana-Elena Barbu, Aalborg (DK); Benny Vejlgaard, Gistrup (DK); Johannes Harrebek, Aalborg (DK); István Zsolt Kovács, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 762 days.

(21) Appl. No.: 17/551,963

(22) Filed: Dec. 15, 2021

(65) Prior Publication Data

US 2022/0232509 A1  Jul. 21, 2022

(30) Foreign Application Priority Data

Jan. 15, 2021 (FI) ........................................ 20215052

(51) Int. Cl.
*H04W 64/00* (2009.01)
(52) U.S. Cl.
CPC .................................. *H04W 64/00* (2013.01)
(58) Field of Classification Search
CPC ......... H04W 64/00; H04W 4/33; H04W 4/02; H04W 4/023; H04W 4/029; H04W 4/021; H04W 84/12; H04W 4/025; H04W 4/90; H04W 16/20; H04W 16/225; H04W 4/027; H04W 12/63; H04W 4/38; H04W 24/10

See application file for complete search history.

(56) References Cited

U.S. PATENT DOCUMENTS

| | | | |
|---|---|---|---|
| 2005/0151642 A1* | 7/2005 | Tupler | H04W 76/50 340/539.18 |
| 2014/0092814 A1 | 4/2014 | Song et al. | |
| 2014/0329540 A1* | 11/2014 | Duggan | H04W 4/029 455/456.1 |
| 2019/0362237 A1* | 11/2019 | Choi | G06N 3/044 |
| 2020/0107159 A1 | 4/2020 | Pandit et al. | |
| 2020/0163044 A1 | 5/2020 | Bapat et al. | |
| 2020/0382228 A1 | 12/2020 | Studer et al. | |

FOREIGN PATENT DOCUMENTS

| | | |
|---|---|---|
| CA | 2442950 A1 | 3/2005 |
| CN | 109075851 A | 12/2018 |
| CN | 110648361 A | 1/2020 |

(Continued)

OTHER PUBLICATIONS

"3rd Generation Partnership Project; Technical Specification Group Radio Access Network; NR; Physical layer measurements (Release 16)", 3GPP TS 38.215, V16.2.0, Jun. 2020, pp. 1-25.

(Continued)

*Primary Examiner* — Kwasi Karikari
(74) *Attorney, Agent, or Firm* — Nokia Technologies Oy

(57) ABSTRACT

A method, apparatus and computer program is described comprising: obtaining reference signals received at a plurality of nodes of a communication system from a user device; generating signal signature matrices based on real and imaginary components of the obtained reference signals; and generating a first three-dimensional position estimate for the user device by applying signals based on the generated signal signature matrices to an input of a model.

20 Claims, 10 Drawing Sheets

(56) References Cited

FOREIGN PATENT DOCUMENTS

CN          112188542 A        1/2021

OTHER PUBLICATIONS

"3rd Generation Partnership Project; Technical Specification Group Services and System Aspects; Service requirements for the 5G system; Stage 1 (Release 17)", 3GPP TS 22.261, V17.3.0, Jul. 2020, 83 pages.

"New WID: NR Positioning Support", 3GPP TSG RAN Meeting #83, RP-190752, Agenda: 9.1.1, Intel Corporation, Mar. 18-21, 2019, 6 pages.

"Introduction of NR positioning support", 3GPP TSG-RAN WG1 Meeting #99, R1-1913661, Ericsson, Nov. 18-22, 2019, 11 pages.

"New SID on NR Positioning Enhancements", 3GPP TSG RAN Meeting #86, RP-193237, Agenda: 9.1.1, Qualcomm Incorporated, Dec. 9-12, 2019, 4 pages.

Ye et al., "HiMeter: Telling You the Height Rather than the Altitude", Sensors, vol. 18, No. 6, Jun. 2018, pp. 1-20.

Wang et al., "Indoor localization in multi-floor environments with reduced effort", IEEE International Conference on Pervasive Computing and Communications (PerCom), Mar. 29-Apr. 2, 2010, pp. 244-252.

Zhao et al., "HYFI: Hybrid floor identification based on wireless fingerprinting and barometric pressure", IEEE Transactions on Industrial Informatics, vol. 13, No. 1, Feb. 2017, pp. 330-341.

Wang et al., "Fusion of barometric sensors, WLAN signals and building information for 3-D indoor/campus localization", in proceedings of International Conference on Multisensor Fusion and Integration for Intelligent Systems, 2006, pp. 1-7.

Murlidharan et al., "Barometric phone sensors: More hype than hope!", Proceedings of the 15th Workshop on Mobile Computing Systems and Applications, Feb. 2014, pp. 1-6.

Radu et al., "HiMLoc: Indoor smartphone localization via activity aware pedestrian dead reckoning with selective crowdsourced WiFi fingerprinting", International Conference on Indoor Positioning and Indoor Navigation, Oct. 28-31, 2013, 10 pages.

"Enhanced 911—Wireless Services", Federal Communications Commission, Retrieved on Dec. 10, 2021, Webpage available at : https://www.fcc.gov/general/enhanced-9-1-1-wireless-services.

"911 and E911 Services", Federal Communications Commission, Retrieved on Dec. 10, 2021, Webpage available at : https://www.fcc.gov/general/9-1-1-and-e9-1-1-services.

Zhang et al., "Deep Learning in Mobile and Wireless Networking: A Survey", arXiv, IEEE Communications Surveys & Tutorials, Jan. 30, 2019, pp. 1-67.

Sano et al., "Multi-sensor location estimation for illegal cell-phone use in real-life indoor environment", IEEE International Conference on Communication Systems (ICCS), Nov. 21-23, 2012, pp. 80-84.

Office action received for corresponding Finnish Patent Application No. 20215052, dated May 24, 2021, 9 pages.

Nikitaki et al., "Localization in wireless networks via spatial sparsity", Conference Record of the Forty Fourth Asilomar Conference on Signals, Systems and Computers, Nov. 7-10, 2010, pp. 236-239.

Ye et al., "Neural-Network-Assisted UE Localization Using Radio-Channel Fingerprints in LTE Networks", IEEE Access, vol. 5, Jun. 5, 2017, pp. 12071-12087.

Extended European Search Report received for corresponding European Patent Application No. 21217257.1, dated Jun. 10, 2022, 7 pages.

Burghal et al., "A Comprehensive Survey of Machine Learning Based Localization with Wireless Signals", arXiv, Dec. 21, 2020, pp. 1-45.

Kim, "Hybrid Building/Floor Classification and Location Coordinates Regression Using a Single-Input and Multi-Output Deep Neural Network for Large-Scale Indoor Localization Based on Wi-Fi Fingerprinting", Sixth International Symposium on Computing and Networking Workshops (CANDARW), Nov. 27-30, 2018, pp. 196-201.

Office action received for corresponding Chinese Patent Application No. 202210040688.0, dated Oct. 23, 2024, 11 pages of office action and 15 pages of translation/summary available.

\* cited by examiner

POSITION ESTIMATION

FIELD

The present specification relates to position estimation in mobile communication systems.

BACKGROUND

Generating a position estimate for devices of a mobile communication system is useful for many purposes. There remains a desire for further developments in this field, particular in relation to vertical position estimation.

SUMMARY

In a first aspect, this specification describes an apparatus comprising means for performing: obtaining reference signals (e.g. uplink sounding reference signals) received at a plurality of nodes of a communication system (e.g. a mobile communication system) from a user device; generating signal signature matrices based on real and imaginary components of the obtained reference signals; and generating a first three-dimensional position estimate for the user device by applying signals based on the generated signal signature matrices to an input of a model. The nodes may be serving and neighbour nodes of the user device. In some example embodiments, missing data points may be added to the signal signature matrices as null data. The first three-dimensional position estimate may be a coarse position estimate.

In some example embodiments, the position estimate is based on a grid having a particular resolution. Thus, each position data variable may be the closest node of the grid to the respective position.

Some example embodiments further comprise means for performing: receiving or deploying said model in response to a positioning request. The request may be an emergency positioning request, such as a UE emergency localisation request.

Some example embodiments further comprise means for performing: compressing the generated signal matrices to generate matrices having lower dimensionality, wherein said first three-dimensional position estimate for the user device is generated by applying the compressed matrices to the input of said model. The said compressing may be performed using PCA, SVD or some similar compression algorithm.

The means for performing generating said position estimate may comprise applying the feature matrix to one or more classifiers to obtain the position estimate. For example, a classifier may be provided for each of x, y and z dimensions of a 3D dimensions of a 3D position estimate.

The means for performing generating said position estimates generates separate x-dimension, y-dimension and z-dimension position estimates. Alternative arrangements are possible, for example a first classifier may generate an x-y position estimate and a second classifier may generate a z-position estimate.

Some example embodiments further comprise means for performing: using data augmentation (e.g. using GAN principles) to generate estimated missing data points in said signal signature matrices. The data augmentation may use machine-learning principles to estimate missing data points based on available reference signals and position estimates of the user device relative to said plurality of nodes. Some example embodiments further comprising means for performing: triggering the use of said data augmentation in the event that a number of null data entries in the signal signature matrices is above a threshold and/or when the final estimate has a high degree of uncertainty. Some example embodiments further comprise means for performing: generating a second three-dimensional position estimate for the user device by applying the generated signal signature matrices, including the estimated missing data points, to the input of said model.

In a second aspect, this specification describes an apparatus (e.g. a model generator) comprising means for performing: obtaining reference signals (e.g. uplink sounding reference signals) from a plurality of user devices at a plurality of nodes (e.g. serving and neighbour nodes) of a communication system, wherein each user device has an identified position (e.g. a known or estimated position) within a three-dimensional space; using cross-correlation to isolate reference signals received from individual user devices at each communication node; generating, for each user device, first and second signal signature matrices based on real and imaginary components of the isolated reference signals respectively; mapping each signal signature matrix to the identified position of the corresponding user device; and training a model (e.g. a machine-learning model (such as CNN, DNN, ResNet etc.)) based on the generated first and second signal matrices and the corresponding identified positions. The said cross-correlation may be between a known signal transmitter by a particular user device and signals received at a particular node of the communication system.

Some example embodiments further comprise means for performing: compressing the generated signal matrices to generate matrices having lower dimensionality, wherein said model is trained based on the compressed matrices and the corresponding identified positions.

The means for performing training said model may further comprise means for performing: generating a plurality of sub-matrices derived from said generated signal matrices, wherein each sub-matrix is used to train one of a plurality of models. At least one of the plurality of sub-matrices may provision vertical position estimates. In one example embodiment, first, second and third models provide x, y and z-dimension position estimates respectively.

Some example embodiments further comprise means for performing: using data augmentation to generate missing data points in said signal signature matrices. Said data augmentation may use GAN or other machine learning principles. Some example embodiment further comprise means for performing: triggering the use of said data augmentation in the event that a number of null data entries in the signal signature matrices is above a threshold.

In the first and second aspects, the said means may comprise: at least one processor; and at least one memory including computer program code, the at least one memory and the computer program configured, with the at least one processor, to cause the performance of the apparatus.

In a third aspect, this specification describes a method comprising: obtaining reference signals (e.g. uplink sounding reference signals) received at a plurality of nodes of a communication system from a user device; generating signal signature matrices based on real and imaginary components of the obtained reference signals; and generating a first three-dimensional position estimate for the user device by applying signals based on the generated signal signature matrices to an input of a model. In some example embodiments, missing data points may be added to the signal signature matrices as null data. The first three-dimensional position estimate may be a coarse position estimate.

Some example embodiments further comprise receiving or deploying said model in response to a positioning request, such as an emergency positioning request.

Some example embodiments further comprise: compressing the generated signal matrices to generate matrices having lower dimensionality, wherein said first three-dimensional position estimate for the user device is generated by applying the compressed matrices to the input of said model. The said compressing may be performed using PCA, SVD or some similar compression algorithm.

Generating said position estimate may comprise applying the feature matrix to one or more classifiers to obtain the position estimate.

Some example embodiments further comprise: using data augmentation (e.g. using GAN principles) to generate estimated missing data points in said signal signature matrices. The data augmentation may use machine-learning principles to estimate missing data points based on available reference signals and position estimates of the user device relative to said plurality of nodes. Some example embodiments further comprise: triggering the use of said data augmentation in the event that a number of null data entries in the signal signature matrices is above a threshold and/or when the final estimate has a high degree of uncertainty. Some example embodiments further comprise: generating a second three-dimensional position estimate for the user device by applying the generated signal signature matrices, including the estimated missing data points, to the input of said model.

In a fourth aspect, this specification describes a method comprising: obtaining reference signals from a plurality of user devices at a plurality of nodes of a communication system, wherein each user device has an identified position within a three-dimensional space; using cross-correlation to isolate reference signals received from individual user devices at each communication node; generating, for each user device, first and second signal signature matrices based on real and imaginary components of the isolated reference signals respectively; mapping each signal signature matrix to the identified position of the corresponding user device; and training a model based on the generated first and second signal matrices and the corresponding identified positions. The said cross-correlation may be between a known signal transmitter by a particular user device and signals received at a particular node of the communication system.

Some example embodiments further comprise: compressing the generated signal matrices to generate matrices having lower dimensionality, wherein said model is trained based on the compressed matrices and the corresponding identified positions.

The means for performing training said model may further comprise: generating a plurality of sub-matrices derived from said generated signal matrices, wherein each sub-matrix is used to train one of a plurality of models. At least one of the plurality of sub-matrices may provision vertical position estimates. In one example embodiment, first, second and third models provide x, y and z-dimension position estimates respectively.

Some example embodiments further comprise: using data augmentation to generate missing data points in said signal signature matrices. Said data augmentation may use GAN or other machine learning principles. The method may include: triggering the use of said data augmentation in the event that a number of null data entries in the signal signature matrices is above a threshold.

In a fifth aspect, this specification describes computer-readable instructions which, when executed by computing apparatus, cause the computing apparatus to perform (at least) any method as described with reference to the third or fourth aspects.

In a sixth aspect, this specification describes a computer-readable medium (such as a non-transitory computer-readable medium) comprising program instructions stored thereon for performing (at least) any method as described with reference to the third or fourth aspects.

In a seventh aspect, this specification describes an apparatus comprising: at least one processor; and at least one memory including computer program code which, when executed by the at least one processor, causes the apparatus to perform (at least) any method as described with reference to the third or fourth aspects.

In an eighth aspect, this specification describes a computer program comprising instructions for causing an apparatus to perform at least the following: obtaining reference signals received at a plurality of nodes of a communication system from a user device; generating signal signature matrices based on real and imaginary components of the obtained reference signals; and generating a first three-dimensional position estimate for the user device by applying signals based on the generated signal signature matrices to an input of a model.

In a ninth aspect, this specification describes a computer program comprising instructions for causing an apparatus to perform at least the following: obtaining reference signals from a plurality of user devices at a plurality of nodes of a communication system, wherein each user device has an identified position within a three-dimensional space; using cross-correlation to isolate reference signals received from individual user devices at each communication node; generating, for each user device, first and second signal signature matrices based on real and imaginary components of the isolated reference signals respectively; mapping each signal signature matrix to the identified position of the corresponding user device; and training a model based on the generated first and second signal matrices and the corresponding identified positions.

In a tenth aspect, this specification describes: means (such as an input) for obtaining reference signals (e.g. uplink sounding reference signals) received at a plurality of nodes of a communication system from a user device; means (such as a processor) for generating signal signature matrices based on real and imaginary components of the obtained reference signals; and means (such as a position estimator) for generating a first three-dimensional position estimate for the user device by applying signals based on the generated signal signature matrices to an input of a model.

In an eleventh aspect, this specification describes: means (such as an input) for obtaining reference signals from a plurality of user devices at a plurality of nodes of a communication system, wherein each user device has an identified position within a three-dimensional space; means (such as a cross-correlation module) for isolating isolate reference signals received from individual user devices at each communication node; means (such as a processor) for generating, for each user device, first and second signal signature matrices based on real and imaginary components of the isolated reference signals respectively; means (such as a mapping module) for mapping each signal signature matrix to the identified position of the corresponding user device; and means (such as machine learning algorithm) for training a model based on the generated first and second signal matrices and the corresponding identified positions.

BRIEF DESCRIPTION OF THE DRAWINGS

Example embodiments will now be described, by way of example only, with reference to the following schematic drawings, in which.

DETAILED DESCRIPTION

Figure 1:
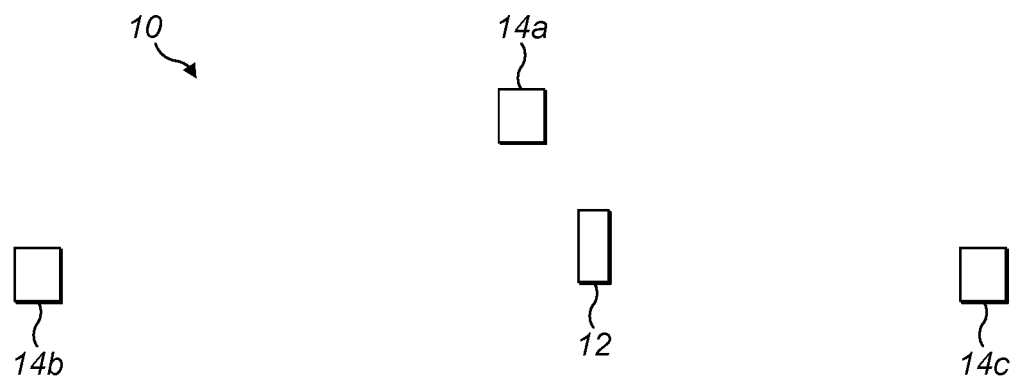
FIG. 1 is a block diagram of a system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, in accordance with an example embodiment. The system 10 comprise a user device 12 and one or more nodes of a mobile communication system (a first node 14a, a second node 14b and a third node 14c are shown in the system 10 by way of example). The user device 12 may be in communication with one or more of the communication nodes 14a to 14c.

Figure 2:
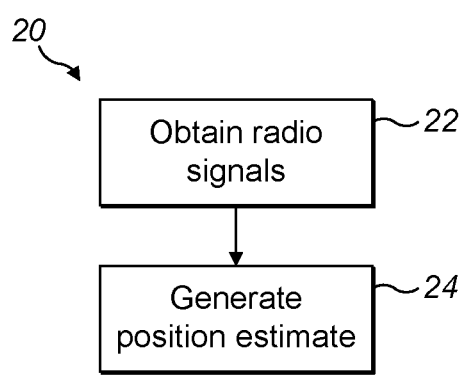
FIGS. 2 to 4 are flow charts showing algorithms in accordance with example embodiments.

FIG. 2 is a flow chart showing an algorithm, indicated generally by the reference numeral 20, in accordance with an example embodiment. The algorithm 20 may be implemented using the system 10.

The algorithm 20 starts at operation 22, where radio signals transmitted between the user device 12 and one or more of the nodes 14a to 14c are obtained. The radio signals may be obtained at the user device 12, at the relevant nodes 14a to 14c and/or at another node (such as a server, e.g. a location management function (LMF)).

At operation 24, a location of the user device 12 is estimated on the basis of the radio signals obtained in the operation 22. The position estimate may be generated at the user device 12, at the relevant nodes 14a to 14c and/or at another node (such as a server, e.g. a location management function (LMF)).

Examples of mechanisms for using radio signals transmitted between a user device and one or more nodes of a mobile communication system to estimate the location of that user device comprise:

Downlink Time Difference of Arrival (DL-TDOA)
Uplink Time Difference of Arrival (UL-TDOA)
Downlink Angle of Departure (DL-AoD)
Uplink Angle of Arrival (UL-AoA)
Multi-cell Round Trip Time (Multi-RTT)

In 3GPP Rel-16, downlink positioning reference signal (PRS) and uplink sounding reference signal (SRS) arrangements were provided for positioning purposes. In 3GPP Rel-17, further developments are being made in New Radio (NR) positioning, including relating to increasing the accuracy of vertical position estimates.

There are many reasons why accurate vertical position estimates of a user device may be desirable. For example, the US Federal Communication Commission (FCC) has produced wireless Enhanced 911 (E911) rules that seek to improve the effectiveness and reliability of wireless 911 services by providing 911 dispatchers with additional information on wireless 911 calls. The E911 rules envisage requiring wireless carriers to provide information such as the latitude and longitude of a caller. In the context of an emergency call from within a building, generating a so-called "dispatchable location" may include information such as a street address, floor level, and room number so that first responders can more quickly locate the caller.

Figure 3:
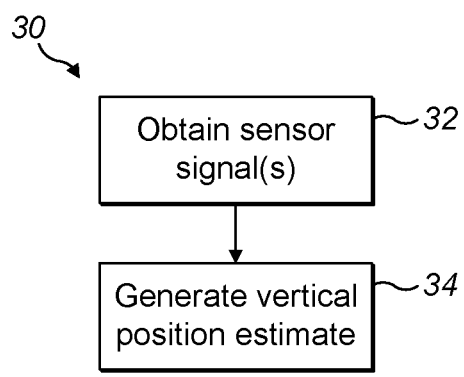

FIG. 3 is a flow chart showing an algorithm, indicated generally by the reference numeral 30, in accordance with an example embodiment. The algorithm 30 may be used to generate an estimate of vertical position, for example for use as part of operation 24 of the algorithm 20.

The algorithm 30 starts at operation 32, where signals from one or more sensors are obtained. Such sensors may include barometric sensors that may be incorporated as part of a user device. At operation 34, a vertical position estimate is obtained based (entirely or in part) on the sensor data obtained in the operation 32.

Barometric sensors for use in vertical position estimation have a number of limitations. For example barometer measurements have several sources of error, such as humidity, temperature, sea level barometric drift, or impact from climate control systems in buildings. Moreover, the use of barometric sensors (or other similar sensors) in the algorithm 30 generates a vertical position estimate that is not based on radio signals.

Figure 4:
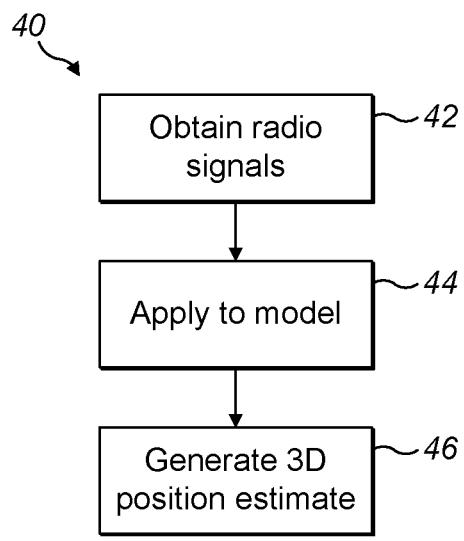

FIG. 4 is a flow chart showing an algorithm, indicated generally by the reference numeral 40, in accordance with an example embodiment.

The algorithm 40 starts at operation 42, where radio signals transmitted between one or more user devices and one or more of the nodes 14a to 14c are obtained. The operation 42 is therefore similar to the operation 22 described above.

At operation 44, some or all of the obtained radio signals are applied to a model, which model may have been trained using machine learning principles, as discussed in detail below.

At operation 46, a 3D position estimate for one or more user devices is generated by the model. The 3D position estimate includes a vertical position estimate. Such a position estimate may have a required accuracy, without requiring the use of external sensors, such as the barometric sensors discussed above.

Figure 5:
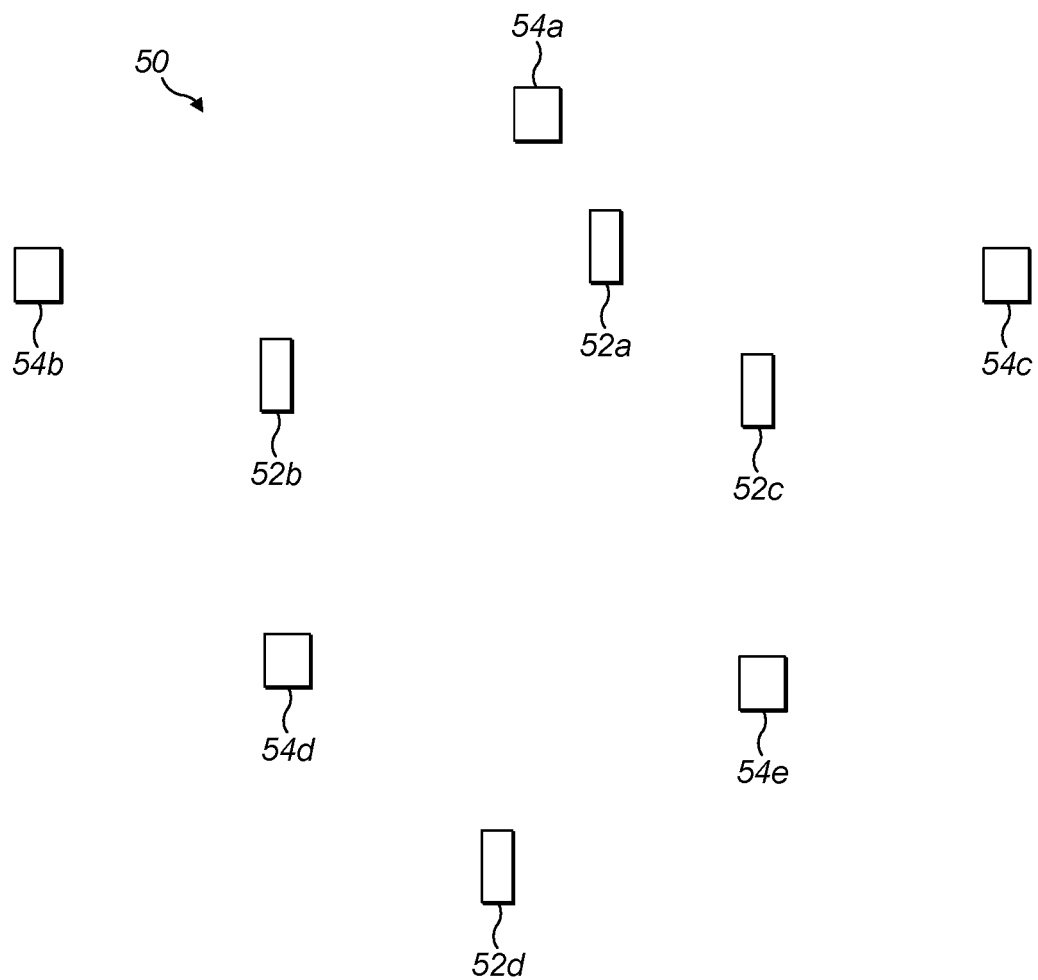
FIG. 5 is a block diagram of a system in accordance with an example embodiment.

FIG. 5 is a block diagram of a system, indicated generally by the reference numeral 50, in accordance with an example embodiment. The system 50 may be used to implement the algorithm 40 described above.

The system 50 comprise a plurality of user device 52a, 52b, 52c, 52d and a plurality of nodes of a mobile communication system (a first node 54a, a second node 54b, a third node 54c, a fourth node 54d and a fifth node 54e are shown in the system 50 by way of example). The user devices 52a to 52d may be in communication with one or more (e.g. all) of the communication nodes 54a to 54e.

In an implementation of the algorithm 40, radio signals (e.g. reference signals, such as sounding reference signals) may be obtained from one of the user devices 52a to 52d at a plurality of nodes of the system 50 (e.g. serving and neighbour nodes of the user device concerned). Signal signature matrices based on real and imaginary components of obtained reference signals (e.g. wideband reference signals) may be obtained and provided to the model in the operation 44 for use in generating a three-dimensional position estimate for the user device, as discussed further below.

Figure 6:
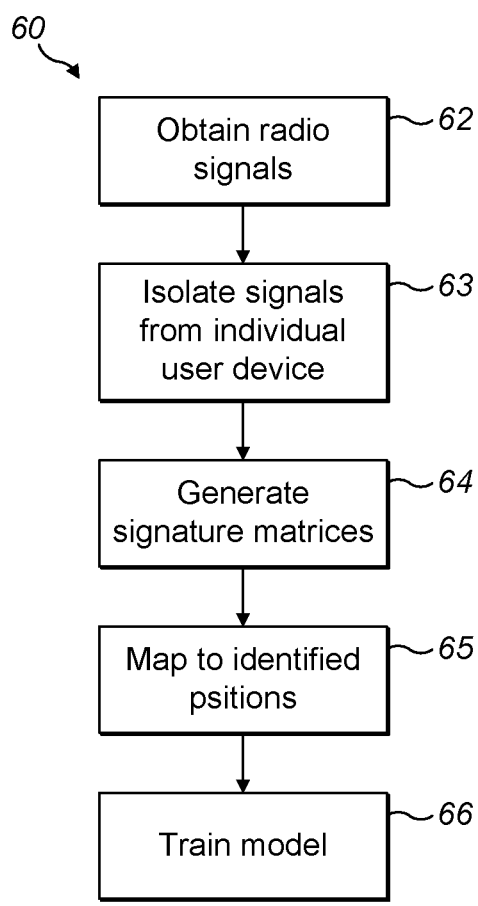
FIG. 6 is a flow chart showing an algorithm in accordance with an example embodiment.

FIG. 6 is a flow chart showing an algorithm, indicated generally by the reference numeral 60, in accordance with an example embodiment. The algorithm 60 may be used for training a model, such as the model used in the operation 44 of the algorithm 40 discussed above.

The algorithm 60 starts at operation 62, where radio signals from a plurality of user device (such as some or all of the user devices 52a to 52d) are received at a plurality of communication nodes (such as some or all the nodes 54a to 54e). Each user device has an identified position (e.g. a known or estimated position) within a three-dimensional space. Thus, the data obtained in the operation 62 is labelled data that can be used for training a model, as discussed further below. In one example embodiment, the radio signals are reference signals, such as uplink sounding reference signals (SRS). The nodes receiving the radio signals may be include a serving node and one or more neighbour nodes of particular user device.

Thus, to train a model, a network collects (in the operation 62) uplink radio signals (e.g. reference signals (RS), such as UE-specific uplink sounding reference signals (SRS), as received by the serving and neighbour nodes). In this first "data association" phase, the network can build a mapping between the received reference signals (the input features) and a 3D position (the labels). These data can be used for training machine learning module(s). To generate labelled training data, the network can adopt various strategies, e.g.:

Using live network measurements. In this case, a network may select and assign a set of reference UEs whose 3D positions are known (e.g. communicated by the UEs themselves, as obtained from UE sensors/non-cellular receivers). The network may collect reference UE measurements over a predefined time window and/or until enough labelled training data has been obtained. This may be decided internally, for example by checking the number of total measurements and the balance between the different label sets. The network may choose random UEs to become reference UEs. Once they are reference UE, they may need to report their 3D position and perform a RS transmission.

Using emulation tools to generate reference signals (RS) from selected locations inside a building. Ray tracing, BVDM, etc. and combinations thereof could be used for this purpose.

A combination of the above methods.

The radio signals received at each node (e.g. transmission reception point (TRP)) in the operation 62 is a superimposition of radio signals from many user devices.

At operation 63, signals from individual user devices as received at communication nodes (e.g. the nodes 54a to 54e) are isolated from one another. This may be achieved using cross-correlation between a known signal transmitted by a particular user device and the signals received at a particular node. For example, a TRP can cross-correlate the received signal with the locally generated copy of the UE-specific transmit signal and analyse whether the specific signature is present in the received signal.

At operation 64, first and second signal signature matrices are generated for each user device based on real and imaginary components of the isolated radio signals respectively at the user device. As discussed further below, any missing data points may be added to the signal signature matrices as null entries.

For example, for signals from a particular UE, as detected at each TRP i, the resulting cross-correlation G complex samples (generated in the operation 63) can be collected in a row vector of complex values x(i). The resulting vector is split into two row vectors xr(i), xi(i), collecting real and imaginary parts. Each row vector is appended as a new row to the matrixes $Xr=[xr(1)^T \ldots xr(N)^T]^T$ and $Xi=[xi(1)^T \ldots xi(N)^T]^T$. These are the input features tagged with the UE 3D location after it has been discretized to a grid of high-resolution D (as discussed below with reference to FIG. 7). It should be noted that the use of discretized 3D positions is described herein by way of example. The principles described herein could be applied to circumstances where the 3D position is given by (x, y, z), where each value takes a real value (instead of an integer/discretized values).

As discussed further below, each matrix Xr/i may fed to a compression block, e.g. PCA, that transforms it to a feature matrix Tr/i of reduced dimensionality, i.e. with a small number of columns, i.e. L<<G.

At operation 65, each signal signature matrix is mapped to the identified position of the corresponding user device. By way of example, some positions are known accurately (such as sensor locations).

At operation 66, the generated first and second signal matrices and the corresponding identified positions are used to train a model. The model may be an ML model (such as CNN, DNN, ResNet etc.) that is trained using machine learning principles. For example, the feature matrices Tr and Ti discussed above may be labelled with the UE location and fed to a supervised machine learning model, e.g. CNN, DNN, ResNet, called FloorML that matches the input feature matrix set to an output consisting of a 3D discrete position [kx, ky, kz] in a 3D positioning grid of chosen resolution D.

As discussed above, in order to generate the model that delivers a mapping between UL RS and an accurate 3D discrete position, the network (e.g. LMF) may collect labelled data. This is accomplished by creating a mapping between the uplink RS sent from a location [a,b,c] and received by N TRPs. To do that, the network may:

Generate a simulation of the wireless propagation model of the building, e.g. using ray tracing, BVDM, etc.

Use live data and designate reference UEs that transmit RS, and whose 3D position is known in advance, e.g. extracted from UE sensors (WiFi receiver, barometric pressure sensors, gyroscope, etc).

A combination of the above.

After the network generates the mapping with one of the methods outlined above, the network collects received signals at all nodes/TRPs 1:N, for all UEs 1:Z.

Figure 7:
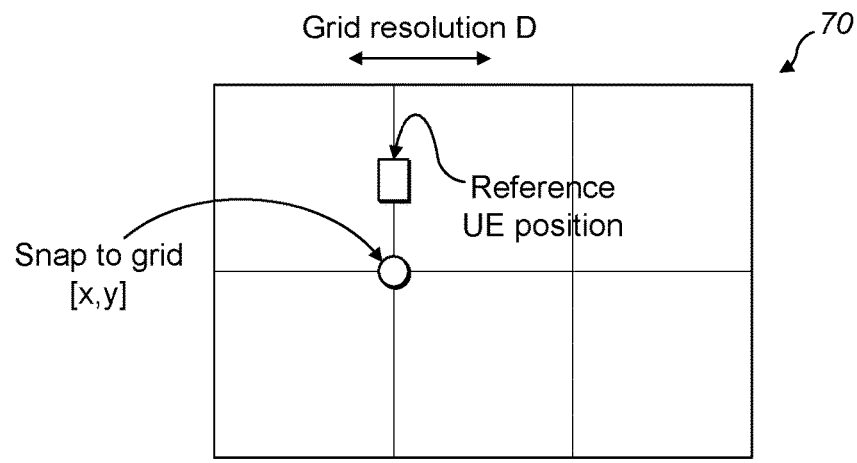
FIGS. 7 to 10 are block diagrams showing aspects of example embodiments.

FIG. 7 is a block diagram, indicated generally by the reference numeral 70, showing an aspect of an example embodiment. The block diagram 70 shows how the network may map a 3D position (e.g. longitude and latitude) of a user device (UE) to a point of a 3D of fixed resolution (e.g. grid resolution D). In one example embodiment a K-nearest neighbours (KNN) algorithm may be used where: [x,y,z]=KNN([lat, long, height]): As noted above, the use of discretized positions is not essential to all example embodiments.

The radio signal received at a particular node (in the operation 62) is denoted as v(n).

As discussed above, in operation 63, the node/TRP n computes the cross correlation between the known transmit signal from a UE a, i.e. s(a), and v(n). That cross-correlation is stored (in operation 64) into a row vector with G elements t(n,a)=xcorr{v(n,a), s(a)}. This is the signal signature of UE a at node/TRP n. In addition, the node/TRP may compute a signal-noise ratio (SNR) level of the received signal, i.e. SNR(n,a). The cross-correlation t(n,a) can be labelled with the position of the user device (UE) after discretization [xa, ya, fa].

The generated data may be stored in a table, such as Table 1 below:

TABLE 1

Observations mapped to labels at each TRP

| Signal signature (features) | Discrete position [x, y, f] (labels) | SNR |
|---|---|---|
| t(n, a) | [xa, ya, fa] | SNR(n, a) |
| ... | ... | ... |
| t(n, Z) | [xz, yz, fz] | SNR(n, Z) |

Figure 8:
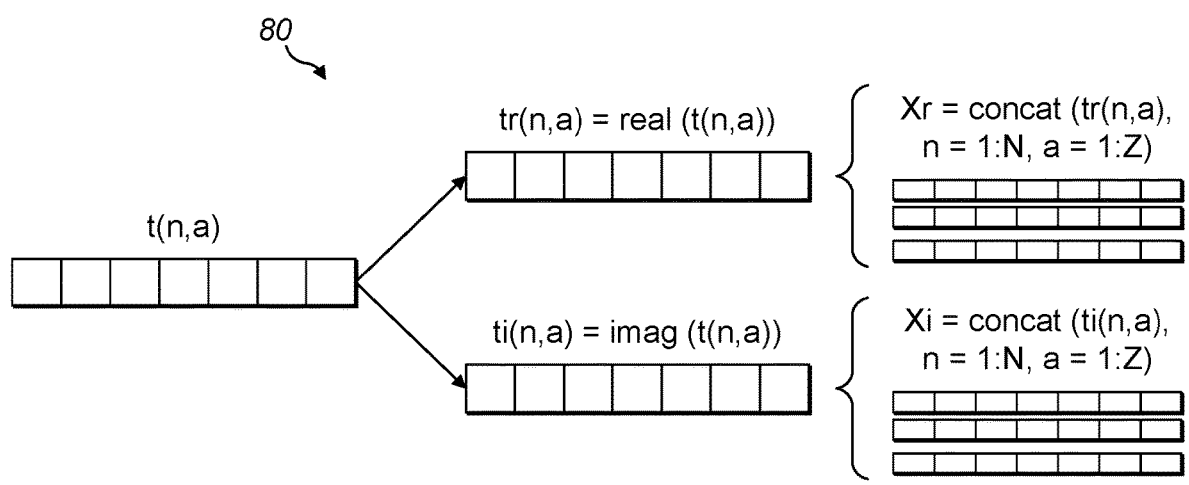

FIG. 8 is a block diagram, indicated generally by the reference numeral 80, showing an aspect of an example embodiment. The block diagram 80 shows an example processing of the cross-correlation data t(n,a) described above with reference to Table 1.

Specifically, in the example block diagram 80, the cross-correlation data t(n,a) is split into a real and imaginary parts, where:

tr(n,a)=real(t(n,a)); and
ti(n.a)=imag(t(n,a)).

The resulting vectors are concatenated into two matrices, Xr and Xi with G columns, corresponding to the number of samples, where:

Xr=concat(tr(n,a), n=1:N, a=1:Z); and
Xi=concat(ti(n,a), n=1:N, a=1:Z).

The real and imaginary matrices (Xr and Xi) are example signatures matrices generated by the operation 64 described above.

Figure 9:
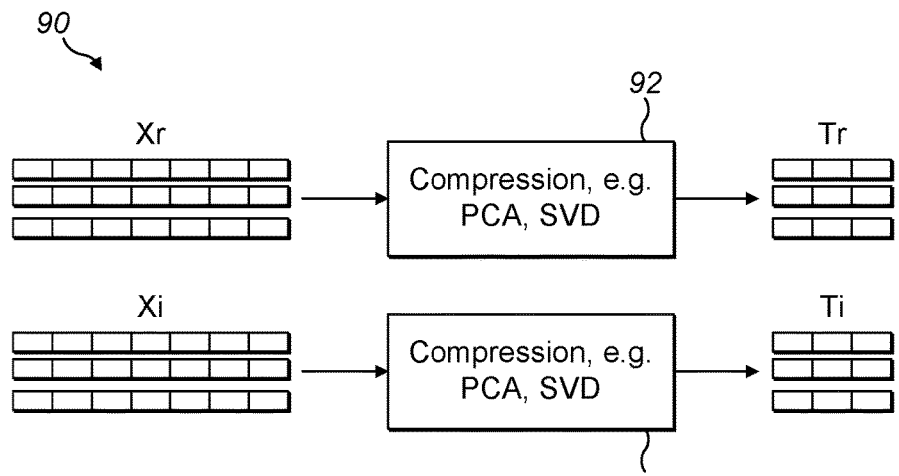

FIG. 9 is a block diagram, indicated generally by the reference numeral 90, showing an aspect of an example embodiment. The block diagram 90 includes a first compression module 92 and a second compression module 94. The first compression module 92 compresses the first matrix Xr into a lower dimensionality matrix Tr (with L<<G columns). Similarly the second compression module 94 compresses the second matrix Xi into a lower dimensionality matrix Ti (with L<<G columns). The compression may be provided to enable a faster transfer of features from nodes/TRPs to LMF.

In some example embodiments, the compressed matrices Tr and Ti and the matrices generated in the operation 64.

Figure 10:
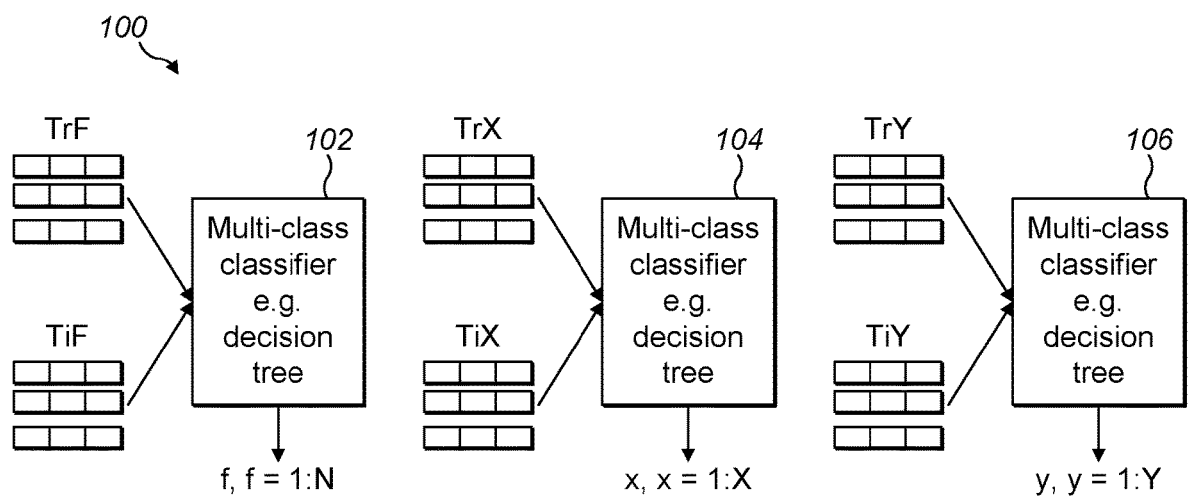

FIG. 10 is a block diagram, indicated generally by the reference numeral 100, showing an aspect of an example embodiment. The block diagram 100 includes a multi-class z-position classifier 102, a multi-class x-position classifier 104 and a multi-class y-position classifier 106.

The compressed matrices Tr and Ti are transferred from nodes/TRPs to a LMF, where they are used as follows:

The rows corresponding to each vertical index f are collected into submatrices TrF(f), TiF(f), f=1:F.
The rows corresponding to an x-position from the discrete grid are collected into submatrices TrX(x), TrX(x), x=1:X.
The rows corresponding to a y-position from the discrete grid are collected into submatrices TrY(x), TrY(x), y=1:Y.

Next, TrF, TiF are input to the multi-class z-position classifier 102, e.g. decision forest or some other ML classifier, TrX, TiR are input to the x-position multi-class classifier 104, and similarly TrY, TiY to the y-position classifier 106. The output activation functions may be e.g. softmax, to output a probability vector associated to each 3D position in the grid. In this way, a plurality of sub-matrices may be derived from the generated signal matrices, wherein each sub-matrix is used to generate one of a plurality of models.

Although the block diagram 100 shows three classifiers (one for each of the x- y- and z-dimensions), this is not essential to all example embodiments. For example, a single classifier for the combined x-y-z coordinates could be provided. This solution can be suitable for cases when there is high likelihood for correlation between the x-y-z coordinates and their sources of errors; e.g. in a high rise building scenarios for UE on floors above the average height of the surrounding buildings. In another example embodiment, two classifiers could be provided, one for the x-y dimensions and a separate one for the z-dimension. This solution can be suitable for cases when there is high likelihood for correlation between the x-y coordinates and their sources of errors, while there is no (or little) expected correlation with the z coordinates; e.g. in a building scenario with many buildings with same average height, for UE on any floors. Another use case for the implementation solution with two classifiers (x-y and z) is when the target location accuracy is expected to be met for the x-y coordinates (e.g. due to reduced errors, GDoP, physically possible locations, etc.) while the location accuracy in the z directions is lower (traditional GNSS/barometric-based solutions). Of course, many other variants of the system 100 are possible.

In another example embodiment, the output of the classifier blocks (such as the classifiers 102 to 106) also includes an estimation of the expected accuracy (trust) of the output coordinates. This trust metric/information can then be used to verify the nominal operation of FloorML during 'live' inference execution. Furthermore, the accuracy information can also be compared with the accuracy information recorded during training phase, to determine the trustfulness of the estimates during 'live' inference execution.

Figure 11:
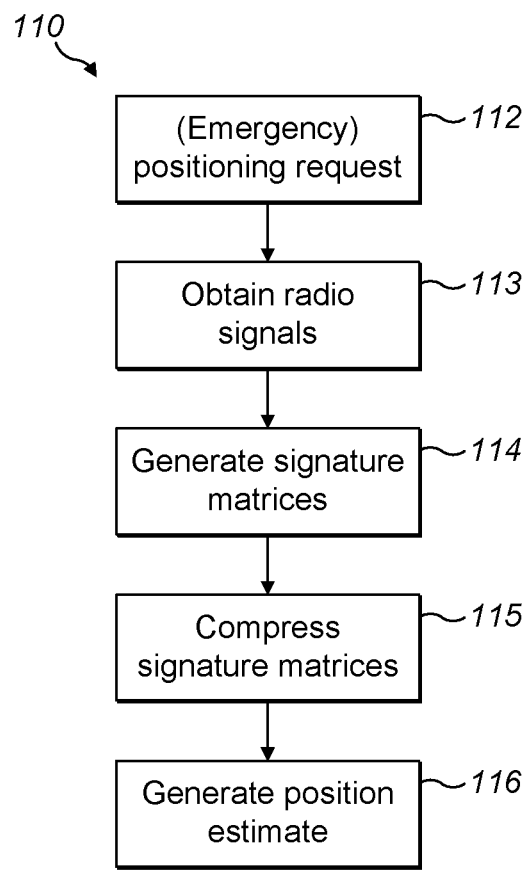
FIG. 11 is a flow chart showing an algorithm in accordance with an example embodiment.

FIG. 11 is a flow chart showing an algorithm, indicated generally by the reference numeral 110, in accordance with an example embodiment. The algorithm 110 shows an example use of the models discussed above for generating a position estimates for a user device.

The algorithm 110 starts at operation 112, where a positioning request is received. The positioning request may be an emergency request (such as a UE emergency localisation request). The operation 112 is one possible mechanism for triggering the generation of a position estimate.

At operation 113, radio signals, such as reference signals (e.g. uplink SRS signals) are obtained. For example, radio signals could be received from a user device at a plurality of nodes of a mobile communication system. The plurality of nodes may comprises a serving node and neighbour nodes for the user device.

At operation 114, signal signature matrices are generated based on real and imaginary components of the obtained reference signals. The signature matrices correspond to the matrices Xr and Xi of the training procedure discussed above. As discussed further below, missing data points may be added to the signal signature as null data.

At operation 115, the signal matrices generated in the operation 114 are compressed (e.g. using PCA, SVD or some similar compression algorithm) to generate matrices having lower dimensionality, wherein said first three-dimensional position estimate for the user device is generated by applying the compressed matrices to the input of said model. The compressed matrices correspond to the matrices Tr and Ti of the training procedure discussed above.

Finally, at operation 116, a three-dimensional position estimate is generated by applying signals based on the generated signal signature matrices to an input of a model (e.g. the model trained in the operation 66 described above). The position estimate may be based on a grid having a particular resolution (so that the position variable is the closest node of the grid to the respective position).

As discussed further below, the position estimate generated in the operation 116 may be a coarse position estimate. That coarse estimate may be further refined.

The learnt model (e.g. FloorML) can therefore be deployed and activated whenever a position request for a user device is required (e.g. in response to a position request—see operation 112—such as an emergency 911 positioning request). Subsequently, the matrices Tr/i are generated using the most recent observations of the UL RS of UE O at all TRPs. A first estimation is run, and the output of FloorML is recorded as new position: [x_o, y_o, z_o].

Figure 12:
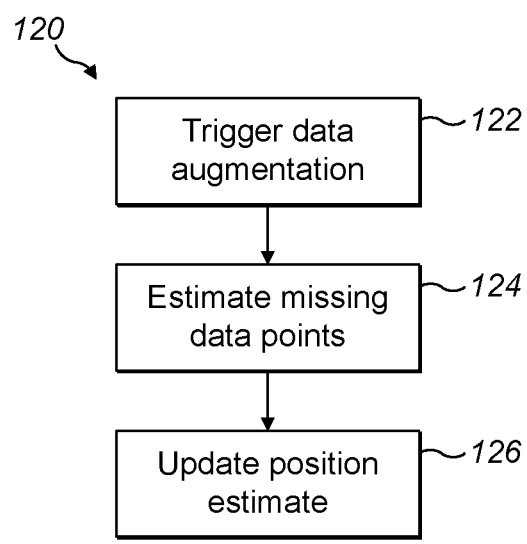
FIG. 12 is a flow chart showing an algorithm in accordance with an example embodiment.

FIG. 12 is a flow chart showing an algorithm, indicated generally by the reference numeral 120, in accordance with an example embodiment. As discussed further below, the algorithm 120 uses data augmentation (e.g. using GAN principles) to generate estimated missing data points in said signal signature matrices.

The algorithm 120 starts at operation 122, where data augmentation is triggered. For example, the operation 112 may comprise a determination that a number of null data entries is above a threshold (which determination can be used to trigger the use of data augmentation). It should be noted that other triggers for data augmentation are possible. For example, data augmentation may be triggered if a position estimate (e.g. as generated in the operation 116 of the algorithm 110) has a high degree of uncertainty (e.g. a large variance).

At operation 124, machine-learning principles are used to estimate missing data points (i.e. at least some of the null entries are estimated). As discussed further below, the missing data points may be based on available reference signals and position estimates of the user device relative to said plurality of nodes.

At operation 126, an updated position estimate for the user device is obtained by applying the generated signal signature matrices, including the estimated missing data points, to the input of said model.

For example, if the matrix Tr/i is row sparse (e.g. RS signals are not received by all the designated TRPs), with the number of null rows larger than a selected threshold (e.g. more than half of the rows of Tr/i are zero), then a further refinement of the initial 3D estimation may be triggered.

Figure 13:
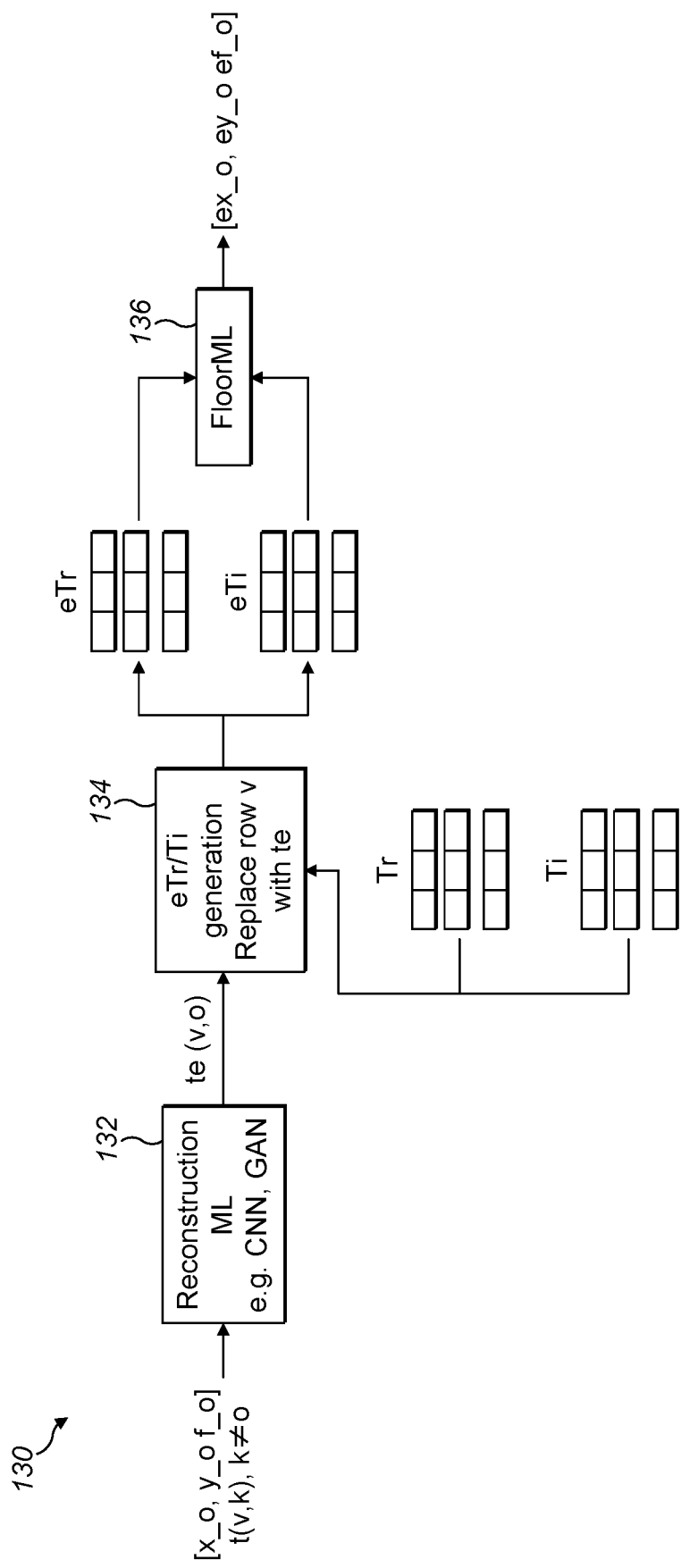
FIG. 13 is a block diagram showing an aspect of an example embodiment.

FIG. 13 is a block diagram, indicated generally by the reference numeral 130, showing an aspect of an example embodiment. The system 130 comprises a reconstruction module 132, a matrix generation module 134 and a position estimation module 136.

Assume that the v-th null row in the matrix Tr/I corresponds to the channel between the estimated UE O's location [x_o, y_o, f_o] and TRP v.

The entries in the Table 1 discussed above corresponding to TRP v are collected into a table (see the Table 2 below):

TABLE 2

| Observations for TRP v mapped to discrete UE positions | | |
|---|---|---|
| Signal signature | Discrete position [x, y, f] | SNR |
| t(v, a) | [xa, ya, fa] | SNR(v, a) |
| ... | ... | ... |
| t(v, Z) | [xz, yz, fz] | SNR(v, Z) |

The task becomes then to reconstruct missing t(v, o) from the available observations stored in Table 2 above. To that end, the reconstruction module 132 (e.g. a ML regression model, such as CNN or GAN) is used to reconstruct the missing vector. In this case, the goal is to use existing UE locations (the second column of the Table 2) and the available signals t(v,j). j=a:Z, to reconstruct t(v,o). This model learns a mapping between a location in the 3D position grid and a channel profile between TRP v and UE O.

Once the signal is reconstructed (thereby implementing the operation 124 of the algorithm 120), the matrix generation module 134 replaces the missing entry in the matrix Tr/i with the reconstructed vector to generate an enhanced matrix, eTr/i.

The enhanced matrix, as output by the matrix generation module 134 is provided to the position estimate module 136 (e.g. the FloorML model described above) to generate an updated position estimate (thereby implementing the operation 126 of the algorithm 120).

The z-dimension of the refined 3D position [ex_o, ey_o, ez_o] can, for example, be mapped to a floor number of a building covering the location for use by emergency services.

In another embodiment, the reconstruction module 132 can be configured to be executed several times using input from different sub-sets of available TRPs.

The embodiments described above are generally trained and deployed at the network side. However, the methods can generally be implemented at the user device side, for example with model downloading and tuning post-training.

Many further variants to the embodiments described above are possible. For example, the proposed position estimation algorithm (e.g. FloorML) can be further augmented by using larger amount of SRS samples received from the target UE. This can be achieved e.g. by enforcing a longer transmission time of the 'emergency call' pre-set for all UEs in given area known to be 'problematic' for localisation purposes (high rise, street canyons, lack of TRPs, etc). A typical SRS configuration, i.e. 1/2/4 OFDM symbols in a SF, with a 2/4/6 frequency comb. With repetition this can be extended to e.g. 1000 SF, which would amount to e.g. 4000 symbols. At a sampling rate of e.g. N=1024 samps/symbol, that yields 4096K samples which after compression the FloorML would handle rather well.

Figure 14:
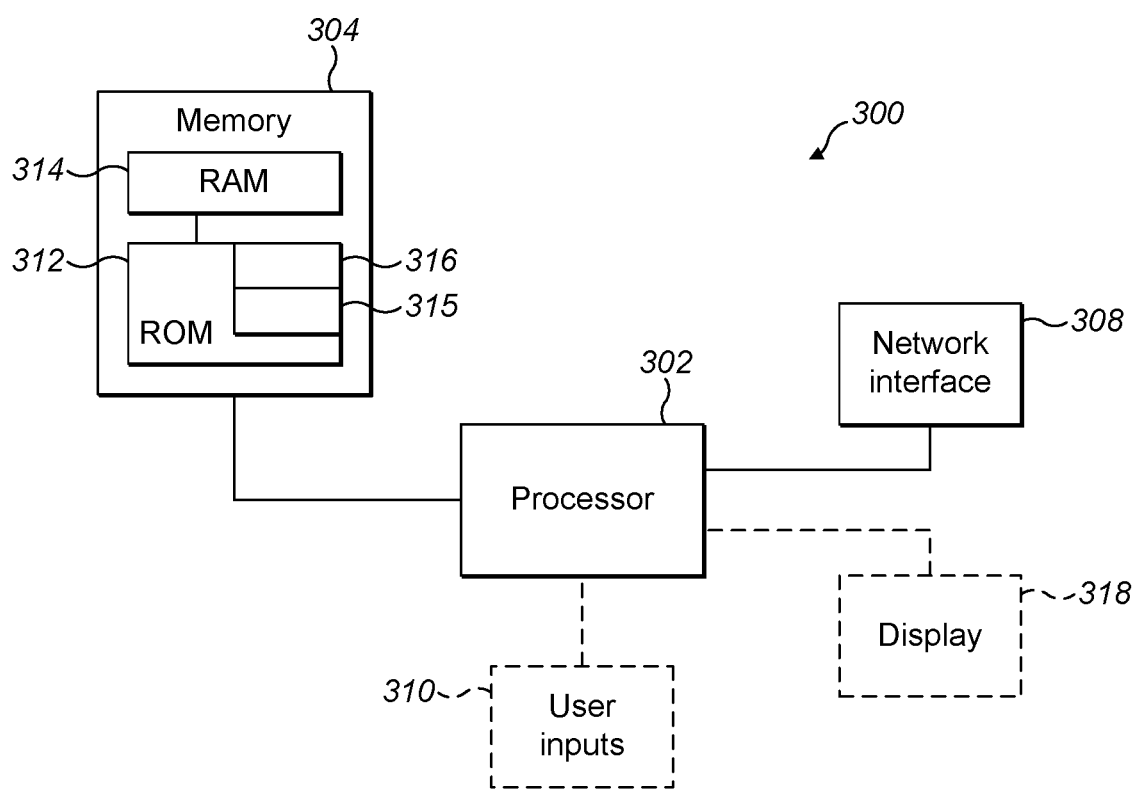
FIG. 14 is a block diagram of components of a system in accordance with an example embodiment.

For completeness, FIG. 14 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 20, 30, 40, 60, 110 and 120 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 15A:
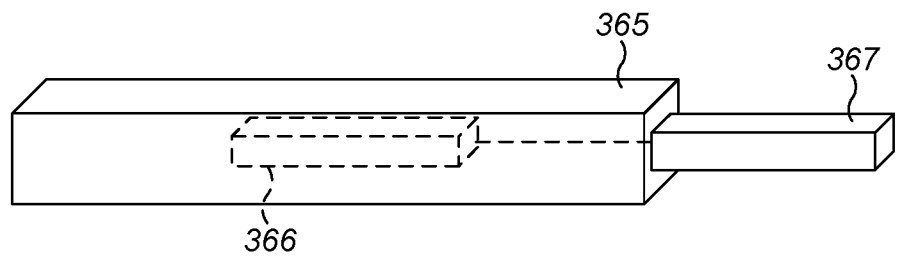
FIGS. 15A and 15B show tangible media, respectively a removable non-volatile memory unit and a compact disc (CD) storing computer-readable code which when run by a computer perform operations according to example embodiment.
Figure 15B:
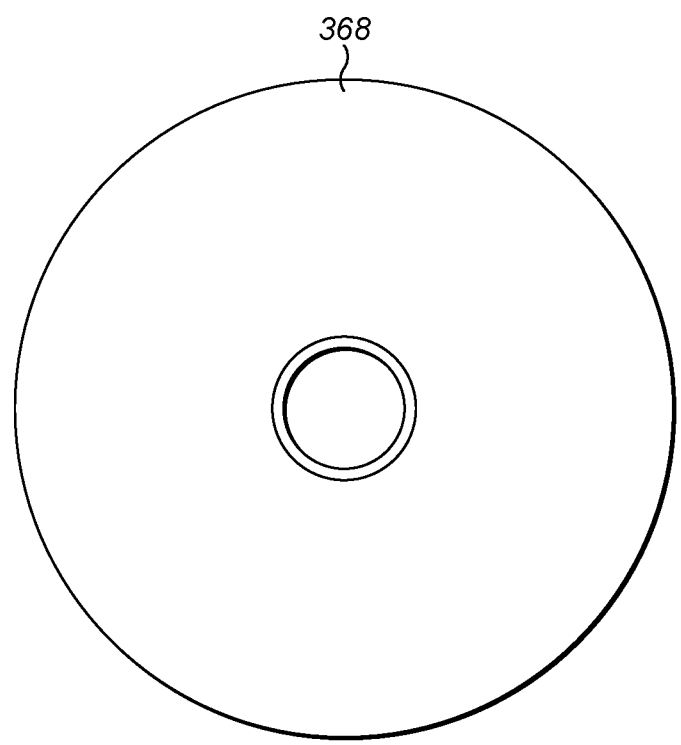

FIGS. 15A and 15B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2, 3, 4, 6, 11 and 12 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor; and at least one memory including computer program code, the at least one memory and the computer program code configured, with the at least one processor, to cause the apparatus at least to:

obtain reference signals received at a plurality of nodes of a communication system from a user device;

generate signal signature matrices based on real and imaginary components of the obtained reference signals;

generate a first three-dimensional position estimate for the user device by applying signals based on the generated signal signature matrices to an input of a model; and compress the generated signal matrices to generate matrices having lower dimensionality, wherein said first three-dimensional position estimate for the user device is generated by applying the compressed matrices to the input of said model.

2. An apparatus as claimed in claim 1, further configured to:
receive or deploy said model in response to a positioning request.

3. An apparatus as claimed in claim 2, wherein the positioning request is a user equipment emergency localization request.

4. An apparatus as claimed in claim 1, wherein the generating said position estimate comprises applying the feature matrix to one or more classifiers to obtain the position estimate.

5. An apparatus as claimed in claim 1, wherein generating said position estimates comprises generating x-dimension, y-dimension and z-dimension position estimates.

6. An apparatus as claimed in claim 1 further configured to:
use data augmentation to generate estimated missing data points in said signal signature matrices.

7. An apparatus as claimed in claim 6, wherein said data augmentation uses machine-learning principles to estimate missing data points based on available reference signals and position estimates of the user device relative to said plurality of nodes.

8. An apparatus as claimed in claim 6, further configured to
trigger the use of said data augmentation in the event that a number of null data entries in the signal signature matrices is above a threshold.

9. An apparatus as claimed in claim 6, further configured to:
generate a second three-dimensional position estimate for the user device by applying the generated signal signature matrices, including the estimated missing data points, to the input of said model.

10. An apparatus as claimed in claim 1 further configured to:
map the z-dimension to a floor number of a building.

11. An apparatus comprising at least one processor; and at least one memory including computer program code, the at least one memory and the computer program code configured, with the at least one processor, to cause the apparatus at least to:
obtain reference signals from a plurality of user devices at a plurality of nodes of a communication system, wherein each user device from the plurality of user devices has an identified position within a three-dimensional space;
use cross-correlation to isolate reference signals received from individual user devices from the plurality of the user devices at each communication node of the plurality of communication nodes;
generate, for each user device from the plurality of user devices, first and second signal signature matrices based on real and imaginary components of the isolated reference signals respectively;
map each signal signature matrix to the identified position of the corresponding user device; and
train a model based on the generated first and second signal matrices and the corresponding identified positions.

12. An apparatus as claimed in claim 11, further configured to:
compress the generated signal matrices to generate matrices having lower dimensionality, wherein said model is trained based on the compressed matrices and the corresponding identified positions.

13. An apparatus as claimed in claim 11, wherein training said model further comprises:
generating a plurality of sub-matrices derived from said generated signal matrices, wherein each sub-matrix from the plurality of sub-matrices is used to train a respective one of a plurality of models.

14. An apparatus as claimed in claim 11 further configured to:
use data augmentation to generate missing data points in said signal signature matrices.

15. An apparatus as claimed in claim 11, where in the reference signal is a sounding reference signal.

16. An apparatus as claimed in claim 11 further configured to:
map the z-dimension to a floor number of a building.

17. An apparatus comprising at least one processor; and at least one memory including computer program code, the at least one memory and the computer program code configured, with the at least one processor, to cause the apparatus at least to:
obtain reference signals received at a plurality of nodes of a communication system from a user device;
generate signal signature matrices based on real and imaginary components of the obtained reference signals; and
generate a first three-dimensional position estimate for the user device by applying signals based on the generated signal signature matrices to an input of a model use data augmentation to generate estimated missing data points in said signal signature matrices.

18. An apparatus as claimed in claim 17, wherein said data augmentation uses machine-learning principles to estimate missing data points based on available reference signals and position estimates of the user device relative to said plurality of nodes.

19. An apparatus as claimed in claim 17, further configured to
trigger the use of said data augmentation in the event that a number of null data entries in the signal signature matrices is above a threshold.

20. An apparatus as claimed in claim 17, further configured to:
generate a second three-dimensional position estimate for the user device by applying the generated signal signature matrices, including the estimated missing data points, to the input of said model.

* * * * *